(No Model.)

P. WOOD.
GATE.

No. 448,402.   Patented Mar. 17, 1891.

Witnesses:
J. A. Southworth.
E. Behel.

Inventor:
Philander Wood.
By A. O. Behel
Atty.

THE NORRIS PETERS CO., PHOTO-LITHO., WASHINGTON, D. C.

UNITED STATES PATENT OFFICE.

PHILANDER WOOD, OF BELVIDERE, ILLINOIS.

GATE.

SPECIFICATION forming part of Letters Patent No. 448,402, dated March 17, 1891.

Application filed October 14, 1890. Serial No. 368,107. (No model.)

*To all whom it may concern:*

Be it known that I, PHILANDER WOOD, a citizen of the United States, residing at Belvidere, in the county of Boone and State of Illinois, have invented certain new and useful Improvements in Gates, of which the following is a specification.

The object of this invention is to form a connection between the bars which serve to support the gate.

Figure 1:
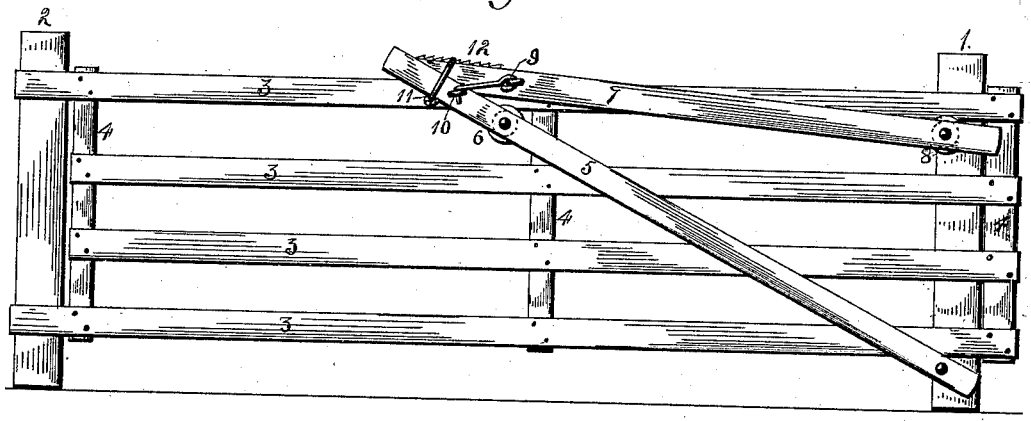
Figure 2:
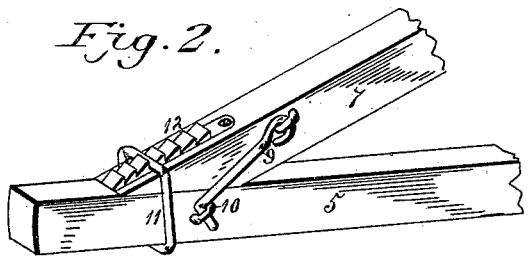

In the accompanying drawings, Figure 1 is a side elevation of a gate embodying the features of my invention. Fig. 2 is an isometrical representation of the supporting-bars, showing their connection.

The gate illustrated by the drawings, accompanying this specification in the main is of a well-known construction, which comprises a hanging-post 1, a latch-post 2, and a gate composed of lengthwise bars 3, held separated by vertical bars 4. The lower hanging-bar 5 has a pivotal connection with the hanging-post at its lower end, while near its upper end is located a roller 6, upon which one of the lengthwise bars 3 rests. The upper hanging-bar 7 has a pivotal connection with the hanging-post, and a roller 8 supports the gate by one of the lengthwise bars 3 resting upon it. The free ends of the hanging-bars 5 and 7 have a connection with each other, so as to form a brace and hold the roller 6 from dropping. This connection consists of a hook 9, attached to the bar 5 and entering an eye 10 in the lower bar. A link 11 has a connection with the under side of the lower bar 5, and its upper horizontal portion engages the teeth of a ratchet 12, secured on the upper surface of the upper bar. By this means of connecting the bars a rigid support is formed for the gate above the rollers. When it is desired to raise or lower the front end of the gate, the hook is disengaged from the eye and the link is moved to a tooth or teeth up or down the ratchet, according to whether the outer end is to be raised or lowered, and the link will hold in the notch into which it has been adjusted. The hook and eye are used when a horizontal adjustment of the gate is required, as this is the position which the gate will occupy most of the time.

My improved connection between the supporting-bars can be employed in connection with a gate of any style in which the free end is raised and lowered.

I claim as my invention—

1. A gate and its hanging-post, in combination with two hanging-bars having a pivotal connection with the hanging-post and a connection with each other, said connection consisting of a ratchet located on one bar and a link connecting the ratchet with the other bar, substantially as set forth.

2. A gate and its hanging-post, in combination with two hanging-bars having a pivotal connection with the hanging-post and a connection with each other, said connection consisting of a ratchet located on one of the bars and a link connecting the ratchet with the other bar, and a hook-and-eye connection between the bars, substantially as set forth.

PHILANDER WOOD.

Witnesses:
A. O. BEHEL,
E. BEHEL.